(12) United States Patent
Akarvardar et al.

(10) Patent No.: US 12,469,535 B2
(45) Date of Patent: Nov. 11, 2025

(54) MULTILEVEL NON-VOLATILE MEMORY DEVICE AND METHOD

(71) Applicant: TAIWAN SEMICONDUCTOR MANUFACTURING COMPANY, LTD., Hsinchu (TW)

(72) Inventors: Kerem Akarvardar, Hsinchu (TW); Hon-Sum Philip Wong, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 17/578,113

(22) Filed: Jan. 18, 2022

(65) Prior Publication Data

US 2023/0125070 A1    Apr. 27, 2023

Related U.S. Application Data

(60) Provisional application No. 63/271,305, filed on Oct. 25, 2021.

(51) Int. Cl.
*G11C 11/00*    (2006.01)

(52) U.S. Cl.
CPC .................... *G11C 11/005* (2013.01)

(58) Field of Classification Search
CPC . G11C 11/005; G11C 11/1675; G11C 11/223; G11C 11/2275; G11C 11/161; G11C 13/0004; G11C 13/0069
See application file for complete search history.

(56) References Cited

U.S. PATENT DOCUMENTS

| | | | | |
|---|---|---|---|---|
| 8,125,837 B2* | 2/2012 | Yamaoka | ............... | G11C 11/412 365/189.09 |
| 8,773,901 B2* | 7/2014 | Park | ....................... | G11C 16/10 365/185.02 |
| 2004/0264244 A1* | 12/2004 | Morimoto | ........... | G11C 11/5685 365/180 |
| 2008/0007993 A1* | 1/2008 | Saitoh | ................ | G11C 13/0069 365/158 |
| 2008/0106926 A1* | 5/2008 | Brubaker | ............... | H10B 63/30 257/E21.665 |
| 2008/0151599 A1* | 6/2008 | Nishinohara | .......... | H10B 51/30 257/E21.663 |

(Continued)

OTHER PUBLICATIONS

Halter, Mattia, et al. "Back-end, CMOS-compatible ferroelectric field-effect transistor for synaptic weights." ACS applied materials & interfaces 12.15 (2020): 17725-17732.

(Continued)

*Primary Examiner* — Khamdan N. Alrobaie
(74) *Attorney, Agent, or Firm* — Hauptman Ham, LLP

(57) ABSTRACT

An integrated circuit (IC) device includes a first terminal, a second terminal, a resistive memory device configured to have a first resistance level in a first state and a second resistance level in a second state, and a switching device including a control terminal and a current path. The resistive memory device and the current path are coupled in series between the first and second terminals, and the switching device is configured to, responsive to a first voltage level at the control terminal, control the current path to have a first conductance level in a first programmed state and a second conductance level in a second programmed state.

20 Claims, 7 Drawing Sheets

(56) References Cited

U.S. PATENT DOCUMENTS

| | | | | |
|---|---|---|---|---|
| 2008/0165573 | A1* | 7/2008 | Nirschl | G11C 13/0004 365/163 |
| 2009/0250678 | A1* | 10/2009 | Osano | H10N 70/826 257/E47.001 |
| 2010/0259967 | A1* | 10/2010 | Yasuda | H10N 70/8828 257/E45.001 |
| 2014/0126268 | A1* | 5/2014 | Katayama | G11C 13/0069 365/148 |
| 2014/0177318 | A1* | 6/2014 | Ting | G11C 13/0007 365/148 |
| 2015/0138871 | A1* | 5/2015 | Lee | G11C 13/0097 365/148 |
| 2015/0200013 | A1* | 7/2015 | Lin | G11C 16/0408 365/185.18 |
| 2018/0300626 | A1* | 10/2018 | Lee | H01L 29/772 |
| 2018/0349761 | A1* | 12/2018 | Lee | G06N 3/049 |
| 2023/0125070 | A1* | 4/2023 | Akarvardar | G11C 13/0004 365/185.05 |

OTHER PUBLICATIONS

Akarvardar, K., et al. "Design considerations for complementary nanoelectromechanical logic gates." 2007 IEEE International Electron Devices Meeting. IEEE, 2007.

* cited by examiner

MULTILEVEL NON-VOLATILE MEMORY DEVICE AND METHOD

PRIORITY CLAIM

The present application claims the priority of U.S. Provisional Application No. 63/271,305, filed Oct. 25, 2021, which is incorporated herein by reference in its entirety.

BACKGROUND

In some applications, integrated circuits (ICs) include non-volatile memory (NVM) circuits that store data in arrays of memory cells that include resistive memory devices. Typically, a resistive memory device is programmable to either a high resistance state (HRS) or a low resistance state (LRS), each state representing a logical level of a bit of data stored in the cell.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
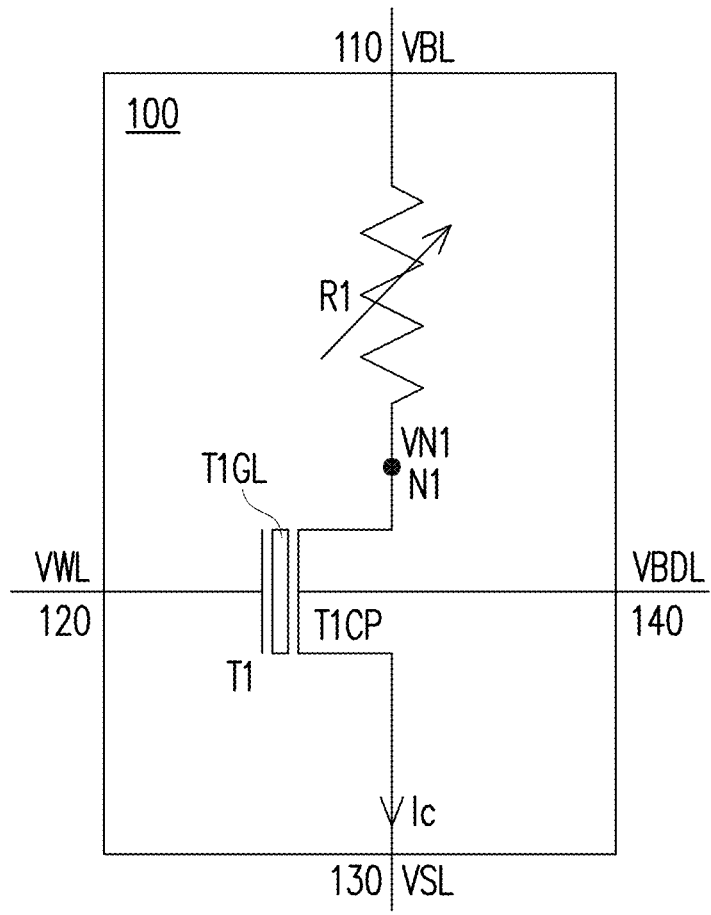
FIG. 1 is a schematic diagram of a memory cell, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In various embodiments, a memory cell includes a resistive memory device coupled in series with a current path of a switching device, the switching device being capable of controlling the current path to have first and second conductance levels for a given input voltage level. The memory cell is thereby programmable to at least four states corresponding to first and second resistance levels of the resistive memory device combined with the first and second conductance levels of the switching device. Compared to approaches in which resistive memory devices are not coupled in series with current paths capable of having first and second conductance levels, a memory array based on the memory cell has increased bit density.

FIG. 1 is a schematic diagram of a memory cell 100, in accordance with some embodiments. Memory cell 100, also referred to as an IC device 100 in some embodiments, includes terminals 110-140 and a resistive memory device R1 coupled in series with a switching device T1 between terminals 110 and 130. Resistive memory device R1 and switching device T1 are electrically coupled to each other at a node N1, and switching device T1 is further coupled to terminals 120 and 140.

In some embodiments, terminal 110 and node N1 are considered to be terminals of resistive memory device R1. In some embodiments, terminals 120-140 and node N1 are considered to be terminals of switching device T1. In some embodiments, terminal 120 is considered to be a gate of switching device T1.

Two or more circuit elements are considered to be coupled based on a direct electrical connection or an electrical connection that includes one or more additional circuit elements and is thereby capable of being controlled, e.g., made resistive or open by a transistor or other switching device.

Resistive memory device R1 is a microelectronic device including an IC structure configured as a current path between terminal 110 and node N1, the current path including one or more materials configured to have a first resistance level in a first state and a second resistance level in a second state. In some embodiments, resistive memory device R1 includes one or more elements (not shown) in addition to the current path, e.g., a heating structure.

In some embodiments, a state of resistive memory device R1 is referred to as a programmed state. In some embodiments, the programmed state corresponds to a logical level. In some embodiments, the first state corresponds to a logically high level and the second state corresponds to a logically low level. In some embodiments, the first resistance level is higher than the second resistance level. In some embodiments, the first resistance level higher than the second resistance level corresponds to the programmed state being a HRS and the second resistance level lower than the first resistance level corresponds to the programmed state being a LRS.

In some embodiments, resistive memory device R1 is configured to have one or more resistance levels in one or more corresponding states in addition to the first and second resistance levels in the first and second states. In some embodiments, resistive memory device R1 is referred to as a multiple-level resistive memory device.

Resistive memory device R1 is configured to retain a given programmed state during periods when memory cell 100 is powered down and/or one or more of terminals 110-140 is floating. In some embodiments, resistive memory device R1 is referred to as an NVM device and memory cell 100 is referred to as an NVM cell.

Resistive memory device R1 is configured to, in a programming operation, switch between states in response to a voltage difference between a voltage VBL at terminal 110 and a voltage VN1 at node N1. In some embodiments, resistive memory device R1 is configured to switch between states in response to a magnitude of the voltage difference VBL-VN1 and independent of a polarity of voltage difference VBL-VN1. In some embodiments, resistive memory device R1 is configured to switch between states in response to both the magnitude and the polarity of voltage difference VBL-VN1.

In some embodiments, resistive memory device R1 includes a resistive random-access memory (ReRAM) device. In some embodiments, a ReRAM device is a microelectronic structure that includes a resistive layer having a thickness between terminal 110 and node N1. In a first programming operation, voltage difference VBL-VN1 across the resistive layer has a magnitude configured to induce formation of one or more filaments, thereby providing the current path between terminal 110 and node N1 having a lower resistance level in the LRS than a resistance level in the HRS prior to the formation of the one or more filaments. In a second programming operation, voltage difference VBL-VN1 across the resistive layer has a magnitude configured to induce self-heating whereby the one or more filaments are reduced or eliminated, thereby restoring the relatively higher resistance level of the HRS.

The resistive layer is one or more layers of dielectric materials configured to receive the voltage difference across the thickness. In various embodiments, the resistive layer includes one or more of an oxide of tungsten (W), tantalum (Ta), titanium (Ti), nickel (Ni), cobalt (Co), hafnium (Hf), ruthenium (Ru), zirconium (Zr), zinc (Zn), iron (Fe), tin (Sn), aluminum (Al), copper (Cu), silver (Ag), molybdenum (Mo), chromium (Cr), or another suitable element, a composite material including, e.g., silicon, or another material capable of having either the HRS or LRS.

In read operations on resistive memory device R1, voltage difference VBL-VN1 corresponds to a current Ic having current levels determined by the magnitude of voltage difference VBL-VN1 and the resistance levels between terminal 110 and node N1. Reliable detection of programmed states, e.g., the HRS and LRS, depends on the resistance levels being sufficiently small to generate detectable current levels of current Ic, sufficiently large to avoid disturbing a programmed state, and sufficiently unequal to allow the programmed states to be distinguished.

In embodiments in which resistive memory device R1 includes the resistive layer, for a given magnitude of voltage difference VBL-VN1, absolute and relative resistance levels of the resistive layer in the HRS and LRS determine corresponding current levels of current Ic. In some embodiments, the resistive layer has the resistance level ranging from 1 kilo-ohm (kΩ) to 40 kΩ in the LRS and/or the resistance level ranging from 15 kΩ to 100 kΩ in the HRS. In some embodiments, the resistive layer has the resistance level ranging from 10 kΩ to 25 kΩ in the LRS and/or the resistance level ranging from 40 kΩ to 60 kΩ in the HRS. In some embodiments, the resistive layer has a first range of resistance levels in the LRS and a second range of resistance levels in the HRS, and a difference between a maximum level of the first range and a minimum level of the second range is greater than the maximum level of the first range multiplied by 0.05 (at least 5% greater than the maximum level of the first range).

In some embodiments, resistive memory device R1 includes a phase-change memory (PCM) device. In some embodiments, a PCM device is an electronic device including a material layer positioned between terminal 110 and node N1 and configured to receive voltage difference VBL-VN1. In some embodiments, in addition to the material layer, the PCM device includes a heating structure (not shown) positioned between or adjacent to terminal 110 and node N1.

The material layer includes one or more layers of one or more resistive materials, also referred to as PCM materials in some embodiments, capable of transitioning between a low-resistance crystalline phase and a high-resistance amorphous phase. In various embodiments, the material layer includes one or more of a chalcogenide material, e.g., germanium-antimony-tellurium (GeSbTe or GST), GeTe, GeSb, or $Sb_2Te_3$, or other suitable phase-change material, and, in some embodiments, one or more dopants, e.g., nitrogen (N), oxygen (O), carbon (C), indium (In), silicon (Si), tin (Sn), gallium (Ga), arsenic (As), selenium (Se), or other suitable dopant materials.

In some embodiments, terminal 110 and node N1 of the PCM device include planar structures arranged in parallel and having a same size and a same shape, e.g., a pillar arrangement. In some embodiments, terminal 110 and node N1 of the PCM device include planar structures arranged in parallel and having differing sizes and/or shapes, e.g., a mushroom arrangement. In some embodiments, terminal 110 and node N1 of the PCM device are otherwise configured, e.g., including concave or other nonplanar geometries, arranged in a non-parallel relationship, and/or having non-continuous shapes, such that the material layer is positioned between terminal 110 and node N1. In some embodiments, terminal 110 and node N1 of the PCM device include one or more of tungsten (W), copper (Cu), aluminum (Al), aluminum-copper, or other suitable conductive materials.

Resistance levels of the material layer are a function of phase configurations based on sizes and geometries of one or more volumes of the material layer in the crystalline and/or amorphous phases. An entirety of the material layer being in the crystalline phase corresponds to a lowest resistance level of resistive memory device R1 and an entirety of the material layer being in the amorphous phase corresponds to a highest resistance level of resistive memory device R1. Intermediate resistance levels correspond to one or more first volumes of the material layer being in the crystalline and one or more second volumes of the material layer being in the amorphous phase.

In some embodiments, the LRS of resistive memory device R1 corresponds to a resistance level within a predetermined threshold of the lowest resistance level and the HRS of resistive memory device R1 corresponds to a resistance level within a predetermined threshold of the highest resistance level.

In some embodiments, the material layer of resistive memory device R1 is configured to have one or more of the intermediate resistance levels corresponding to one or more programmed states. In some embodiments, two or more of the lowest, highest, and/or intermediate resistance levels of the material layer correspond to two or more programmable states of resistive memory device R1.

In programming operations on resistive memory device R1, phase configurations, and thereby the resistance levels, of the material layer are set in response to voltage difference VBL-VN1. In some embodiments, the material layer is configured to be set in response to voltage difference VBL-VN1 including one or more pulses configured to induce heating and/or cooling profiles whereby the sizes and geometries of the one or more volumes of the material layer in the crystalline and/or amorphous phases are controlled.

In a read operation, the current level of current Ic is thereby based on voltage difference VBL-VN1 and the resistance level of the material layer such that reliable detection of the programmed states is affected by the resistance level as discussed above. In some embodiments, the material layer has the resistance level ranging from 1 kΩ to 100 kΩ. In some embodiments, the resistive layer has the resistance level ranging from 10 kΩ to 1 mega-ohm (MΩ).

In some embodiments, resistive memory device R1 includes a magneto-resistive random-access memory (MRAM) device. In some embodiments, an MRAM device is a microelectronic device including a magnetic tunnel junction (MTJ) structure. The MTJ structure includes first and second magnetic layers, e.g., ferromagnetic layers, separated by an insulation layer, e.g., an aluminum oxide layer, (not shown) and arranged in series between terminal 110 and node N1.

The first magnetic layer has a pinned magnetic orientation and the second magnetic layer has a magnetic orientation configurable to be either aligned with or opposite that of the first magnetic layer. The insulation layer is configured to conduct a tunneling current such that a resistance of the MTJ has a first resistance level corresponding to the first and second magnetic layers having opposite orientations and a second resistance level corresponding to the first and second magnetic layers having aligned orientations, the first resistance level being higher than the second resistance level. In some embodiments, the first resistance level corresponds to the HRS and the second resistance level corresponds to the LRS.

In programming operations, the first and second magnetic layers are configured to switch between the two orientations, and thereby between programmed states, based on voltage levels of voltage difference VBL-VN1 having opposite polarities and magnitudes sufficiently large to generate current Ic having current levels capable of realigning the magnetic orientation of the second magnetic layer.

In a read operation, the current level of current Ic is thereby based on voltage difference VBL-VN1 and the resistance level of the first and second magnetic layers such that reliable detection of the programmed states is affected by the resistance level as discussed above. In some embodiments, the first and second magnetic layers have the resistance level ranging from 1 kΩ to 100 kΩ. In some embodiments, the first and second magnetic layers have the resistance level ranging from 10 kΩ to 60 kΩ.

The configurations of resistive memory device R1 discussed above are non-limiting examples provided for the purpose of illustration. Configurations other than those discussed above, e.g., resistive memory device R1 including a conductive-bridging RAM (CBRAM) device, whereby resistive memory device R1 is capable of being programmed to two or more resistance levels, e.g., the HRS and LRS, are within the scope of the present disclosure.

Switching device T1 is a microelectronic device including a current path T1CP positioned between node N1 and terminal 130, current path T1CP thereby being coupled in series with resistive memory device R1 between terminals 110 and 130. Switching device T1 also includes terminal 120 configured as a control terminal separated from current path T1CP by a gate layer T1GL, and terminal 140 coupled to a body of switching device T1 in which current path T1CP is positioned.

Switching device T1 is configured to control a conductance level of current path T1CP responsive to a voltage difference between a voltage VWL at terminal 120 and a voltage VSL at terminal 130. In the embodiment depicted in FIG. 1, switching device T1 is configured to further control the conductance level of current path T1CP responsive to a voltage VBDL at terminal 140. In some embodiments, switching device T1 does not include terminal 140, and the body of switching device T1 in which current path T1CP is positioned is configured to float or is coupled to node N1 or terminal 130.

In some embodiments, switching device T1 includes a transistor, e.g., an n-type metal oxide semiconductor (NMOS) transistor or a p-type metal oxide semiconductor (PMOS) transistor, current path T1CP is a channel of the transistor, each of node N1 and terminal 130 corresponds to a source/drain (S/D) terminal of the transistor, and terminal 140 corresponds to a substrate or bulk contact of the transistor. In some embodiments, control of the conductance level of current path T1CP responsive to voltage difference VWL-VSL corresponds to one or more transconductance relationships of the transistor. In some embodiments, switching device T1 is referred to as a selection transistor.

For a given voltage level of the voltage difference VWL-VSL, switching device T1 is configured to control current path T1CP to have a first conductance level in a first programmed state and a second conductance level in a second programmed state. In some embodiments, the first conductance level corresponds to a first threshold voltage level of switching device T1 in the first programmed state and the second conductance level corresponds to a second threshold voltage level of switching device T1 in the second programmed state.

In the embodiment depicted in FIG. 1, switching device T1 is configured to control the conductance level of current path T1CP by including gate layer T1GL located between control terminal 120 and current path T1CP. Gate layer T1GL is capable of having programmable physical states, e.g., fixed charge distributions, whereby an electric field strength and/or polarity at current path T1CP are/is controllable for a given voltage level of voltage difference VWL-VSL.

In some embodiments, switching device T1 is otherwise configured to control the conductance level of current path T1CP for a given voltage level of voltage difference VWL-VSL, e.g., by including a second control terminal or by including a layer similar to gate layer T1GL at a location other than between control terminal 120 and current path T1CP.

In some embodiments, the programmed state corresponds to a logical level. In some embodiments, the first programmed state corresponds to a logically high level and the second programmed state corresponds to a logically low level. In some embodiments, the first conductance level is lower than the second conductance level. In some embodiments, the first threshold voltage level is greater than the second threshold voltage level.

In some embodiments, switching device T1 is configured to have one or more conductance levels and threshold voltage levels in one or more corresponding programmed states in addition to the first and second conductance levels and threshold voltage levels. In some embodiments, switching device T1 is referred to as a multiple-level switching device.

Switching device T1 is configured to retain a given programmed state during periods when memory cell 100 is powered down and/or one or more of terminals 110-140 is floating. In some embodiments, switching device T1 is referred to as an NVM device and memory cell 100 is referred to as an NVM cell.

In some embodiments, in operation, each of the conductance level and threshold voltage level corresponding to a given programmed state of switching device T1 is capable of being increased and/or decreased responsive to a voltage level of voltage VBDL at terminal 140.

Switching device T1 is configured to, in a programming operation, switch between states in response to voltage difference VWL-VSL and voltage differences between voltage VWL and each of voltages VN1 and voltage VBDL. In some embodiments, in a programming operation, switching device T1 is configured to switch between states in response to voltages VSL, VBDL, and VN1 having a same voltage level such that each of voltage differences VWL-VBDL and VWL-VN1 is equal to voltage difference VWL-VSL.

In some embodiments, switching device T1 is configured to switch between states in response to magnitudes of voltage differences VWL-VSL, VWL-VBDL, and/or VWL-VN1 and independent of polarities of voltage differences VWL-VSL, VWL-VBDL, and/or VWL-VN1. In some embodiments, switching device T1 is configured to switch between states in response to both the magnitudes and polarities of one or more of voltage differences VWL-VSL, VWL-VBDL, or VWL-VN1.

In some embodiments, switching device T1 includes a ferroelectric field effect transistor (FeFET). In some embodiments, a FeFET includes gate layer T1GL including a ferroelectric layer including one or more ferroelectric materials in which electric dipoles have orientations controllable responsive to one or more of voltage differences VWL-VSL, VWL-VBDL, or VWL-VN1. In some embodiments, the one or more ferroelectric materials include lead zirconate titanate (PZT), hafnium oxide (HfO$_2$), hafnium zirconium oxide (HZO), or other suitable ferroelectric materials.

In some embodiments, gate layer T1GL including a ferroelectric layer also includes one or more dielectric layers (not shown) including one or more dielectric materials, e.g., SiO$_2$ and/or one or more high-k dielectric materials, between gate terminal 120 and the ferroelectric layer and/or between the ferroelectric layer and current path T1CP.

In some embodiments, switching device T1 includes a charge-trap transistor (CTT), also referred to as a charge-trap flash (CTF) device in some embodiments. In some embodiments, a CTT includes gate layer T1GL including a silicon nitride layer in which charge distributions are controllable responsive to one or more of voltage differences VWL-VSL, VWL-VBDL, or VWL-VN1. In some embodiments, a CTT includes gate layer T1GL including one or more materials other than the silicon nitride layer in which charge distributions are controllable responsive to one or more of voltage differences VWL-VSL, VWL-VBDL, or VWL-VN1.

In some embodiments, gate layer T1GL including the silicon nitride layer also includes one or more dielectric layers (not shown) including one or more dielectric materials, e.g., SiO$_2$ and/or one or more high-k dielectric materials, between gate terminal 120 and the silicon nitride layer and/or between the silicon nitride layer and current path T1CP. In some embodiments, one or more dielectric layers is a tunneling layer.

The configurations of switching device T1 discussed above are non-limiting examples provided for the purpose of illustration. Configurations other than those discussed above, whereby switching device T1 is capable of being programmed to have two or more conductance levels of current path T1CP for a given voltage level of voltage difference VWL-VSL, are within the scope of the present disclosure. In some embodiments, switching device T1 includes a fully depleted silicon-on-insulator (FDSOI) device, e.g., an ultra-thin body (UTB) FDSOI, a micro-electro-mechanical systems (MEMS) device, or a nanoelectromechanical (NEM) device.

In the embodiment depicted in FIG. 1, node N1 is an internal node of memory cell 100. In some embodiments, memory cell 100 includes a terminal (not shown) in addition to terminals 110-140 or instead of one of terminals 110-140, and node N1 is coupled to the terminal such that voltage VN1 is capable of being detected and/or controlled externally to memory cell 100.

In the embodiment depicted in FIG. 1, memory cell 100 includes resistive memory device R1 and switching device T1 arranged in series based on resistive memory device R1 being positioned between terminal 110 and node N1, and switching device T1 being positioned between node N1 and terminal 130. In some embodiments, memory cell 100 includes resistive memory device R1 and switching device T1 otherwise arranged in series, e.g., based on switching device T1 being positioned between terminal 110 and node N1, and resistive memory device R1 being positioned between node N1 and terminal 130.

In some embodiments, one or both of resistive memory device R1 or switching device T1 is a front-end of line (FEOL) device. In some embodiments, one or both of resistive memory device R1 or switching device T1 is a back-end of line (BEOL) device.

Figure 2A:
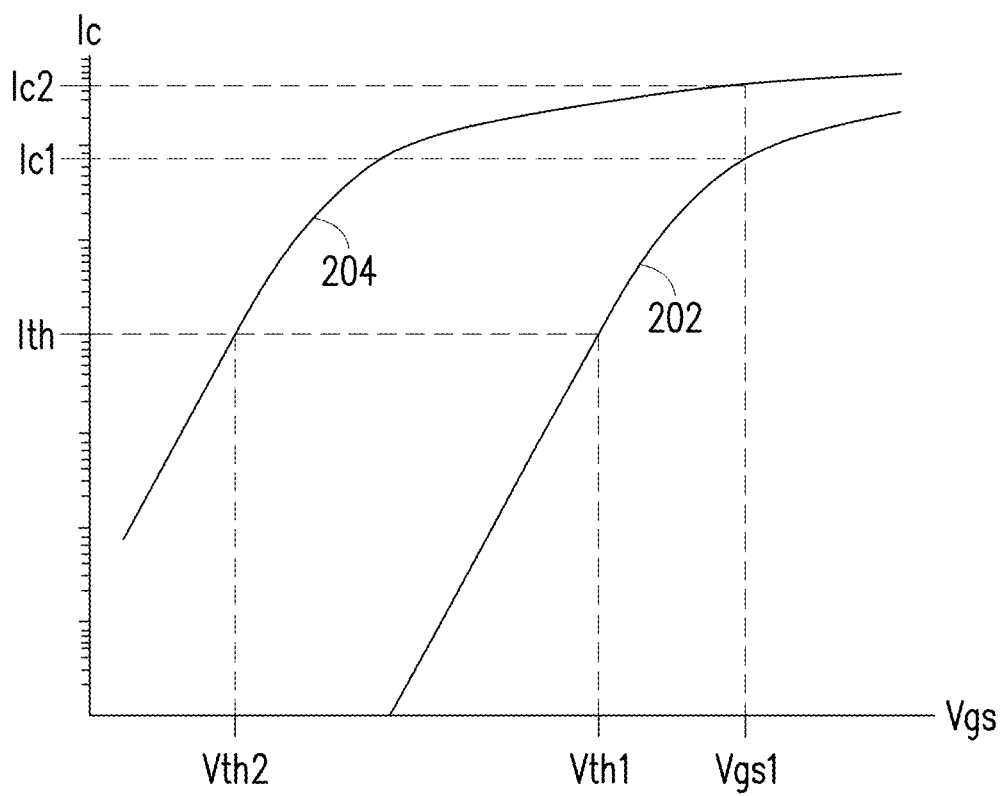
FIGS. 2A-2C are diagrams of memory cell parameters, in accordance with some embodiments.
Figure 2B:
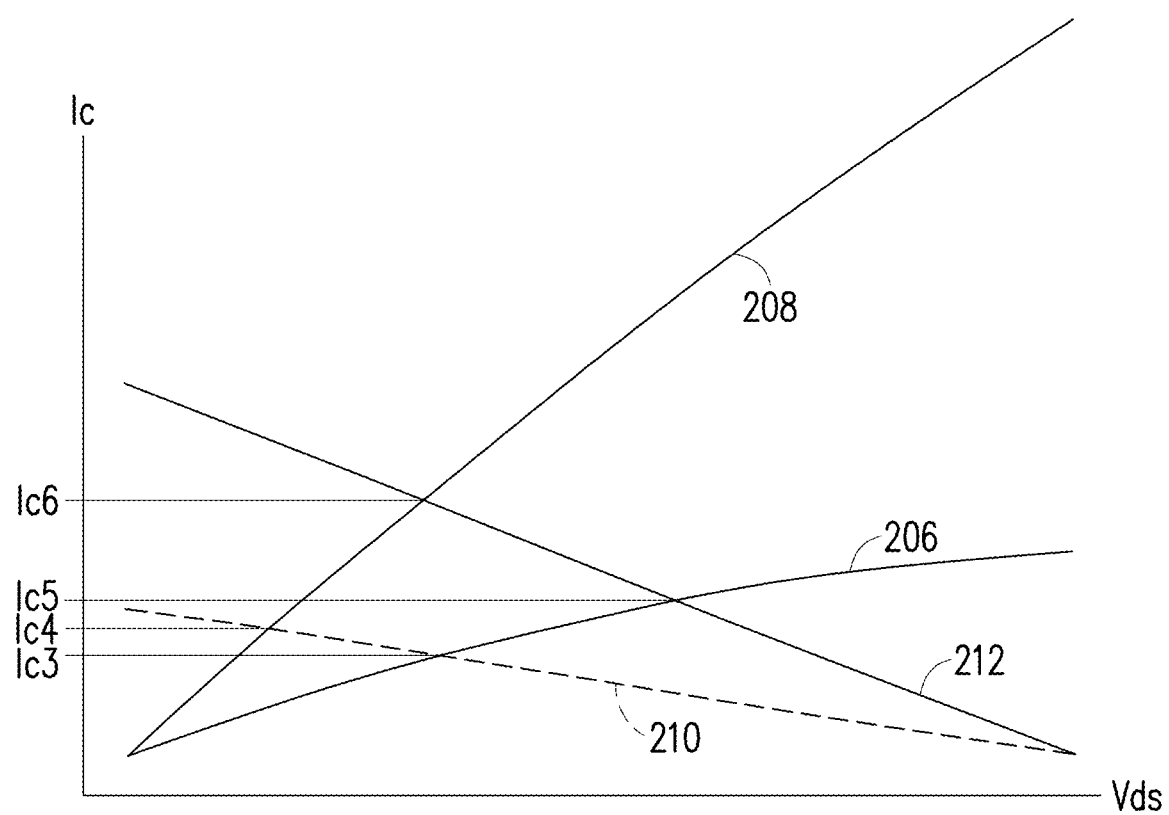
Figure 2C:
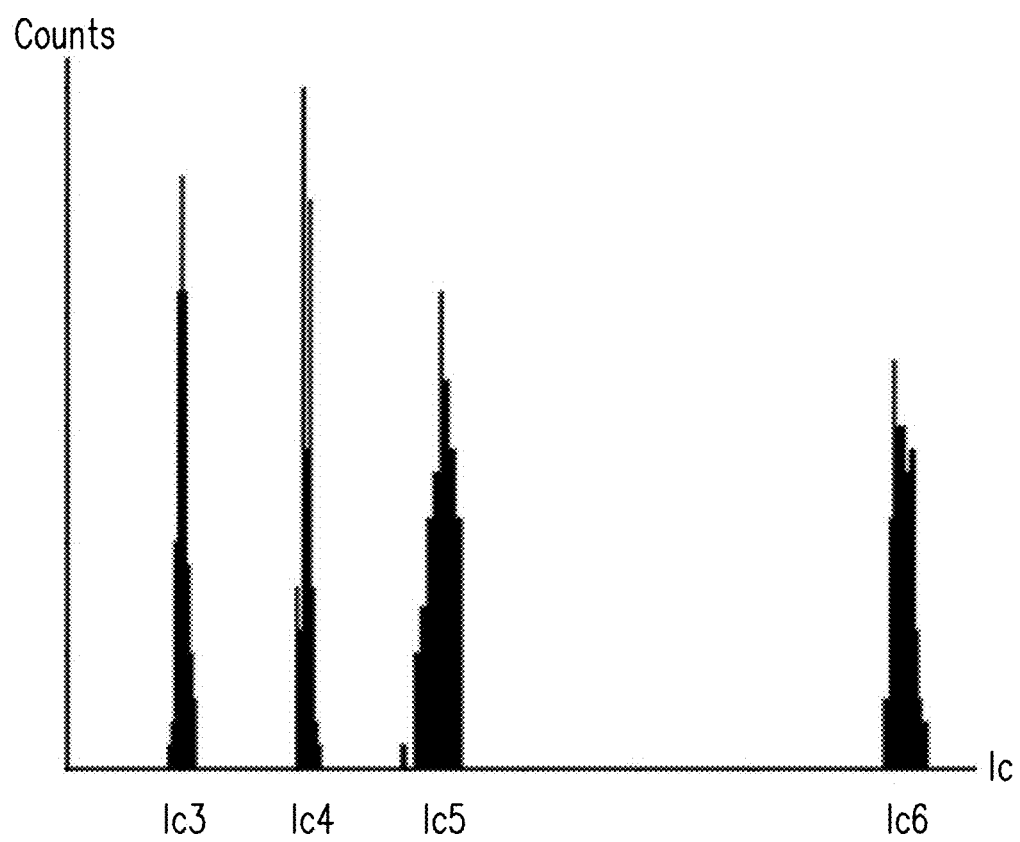

FIGS. 2A-2C are diagrams of memory cell parameters, in accordance with some embodiments. The parameters correspond to a non-limiting example of memory cell 100 in which resistive memory device R1 is programmable to each of the first (HRS) and second (LRS) resistance levels, and switching device T1 is a transistor capable of having the first and second programmed states. FIG. 2A illustrates the first and second programmed states of switching device T1, FIG. 2B illustrates a combination of the HRS and LRS of resistive memory device R1 and the first and second programmed states of switching device T1, and FIG. 2C illustrates read operations on memory cell 100.

FIG. 2A depicts current Ic plotted (logarithmically) as a function of a gate/source voltage Vgs corresponding to voltage difference VWL-VSL for a given value of a drain/source voltage difference VN1-VSL (drain/source voltage Vds depicted in FIG. 2B). Curves 202 and 204 represent the respective first and second programmed states of switching device T1.

In the embodiment depicted in FIG. 2A, threshold voltage levels of switching device T1 are based on a threshold current level Ith. The first programmed state corresponds to a threshold voltage level Vth1 greater than a threshold voltage level Vth2 corresponding to the second programmed state.

At a gate voltage level Vgs1, greater than each of threshold voltage levels Vth1 and Vth2 in the embodiment depicted in FIG. 2A, current Ic has a current level Ic1 in the first programmed state and a current level Ic2 in the second programmed state. Current level Ic2 is greater than current level Ic1, corresponding to the conductance of current path T1CP of switching device T1 having conductance level Ic2/Vds in the second programmed state greater than conductance level Ic1/Vds in the first programmed state.

In the embodiment depicted in FIG. 2A, gate voltage level Vgs1 corresponds to switching device T1 operating in the saturation region in each of the first and second programmed states. In some embodiments, a gate voltage level corresponds to switching device T1 operating in a linear region in the first programmed state and operating in the saturation region in the second programmed state.

The conductance levels of current path T1CP at gate voltage level Vgs1 correspond to the given value of voltage Vds. In some embodiments, one or both of the conductance levels corresponding to the first and second programmed states of switching device T1 is constant with respect to drain/source voltage Vds such that current Ic varies linearly as a function of drain/source voltage Vds around the given value of drain/source voltage Vds. In some embodiments, one or both of the conductance levels corresponding to the first and second programmed states of switching device T1 varies with respect to drain/source voltage Vds such that current Ic varies nonlinearly as a function of drain/source voltage Vds around the given value of drain/source voltage Vds.

FIG. 2B depicts current Ic plotted as a function of drain/source voltage Vds for given values of each of gate/source voltage Vgs and voltage difference VBL-VSL. Curves 206 and 208 represent the respective first and second programmed states of switching device T1. In the embodiment depicted in FIG. 2B, current Ic varies nonlinearly as a function of drain/source voltage Vds in the first programmed state, and approximately linearly as a function of drain/source voltage Vds in the second programmed state.

A curve 210 represents a load line based on the first resistance level (HRS) of resistive memory device R1, and a curve 212 represents a load line based on the second resistance level (LRS) of resistive memory device R1.

The intersection of curve 206 representing the first programmed state of switching device T1 and curve 210 representing the first resistance level of resistive memory device R1 corresponds to a first programmed state of memory cell 100 and a current level Ic3. The intersection of curve 208 representing the second programmed state of switching device T1 and curve 210 representing the first resistance level of resistive memory device R1 corresponds to a second programmed state of memory cell 100 and a current level Ic4 greater than current level Ic3. The intersection of curve 206 representing the first programmed state of switching device T1 and curve 212 representing the second resistance level of resistive memory device R1 corresponds to a third programmed state of memory cell 100 and a current level Ic5 greater than current level Ic4. The intersection of curve 208 representing the second programmed state of switching device T1 and curve 212 representing the second resistance level of resistive memory device R1 corresponds to a fourth programmed state of memory cell 100 and a current level Ic6 greater than current level Ic5.

Current levels Ic3-Ic6 are depicted in FIG. 2C for an array of memory cells 100 in which cells counts are displayed as a function of current Ic. As illustrated in FIG. 2C, current levels Ic3-Ic6 are sufficiently large to be detectable and sufficiently unequal to allow the programmed states of memory cells 100 to be distinguished.

The four programmed states of memory cell 100 depicted in FIGS. 2A-2C is a non-limiting example provided for the purpose of illustration. In some embodiments, one or more of resistance levels of resistive memory device R1, conductance levels of current path T1CP, and/or voltage levels of one or both of gate/source voltage Vgs or voltage difference VBL-VSL are otherwise configured such that current levels Ic3-Ic6 have a magnitude-based order other than the order depicted in FIGS. 2B and 2C, e.g., an order in which current level Ic4 is greater than current level Ic5.

In some embodiments, resistive memory device R1 is capable of having more than two resistance levels and/or switching device T1 is capable of having more than two programmed states such that memory cell 100 is capable of having more than four programmed states, each of the programmed states corresponding to a current level at the given values of each of gate/source voltage Vgs and voltage difference VBL-VSL.

By the configuration discussed above, memory cell 100 including resistive memory device R1 coupled in series with current path T1CP of switching device T1 is thereby programmable to at least four states corresponding to first and second resistance levels of resistive memory device R1 combined with the first and second conductance levels of current path T1CP. Compared to approaches in which resistive memory devices are not coupled in series with current paths capable of having first and second conductance levels, each of memory cell 100 and a memory array based on memory cell 100 has increased bit density.

Figure 3:
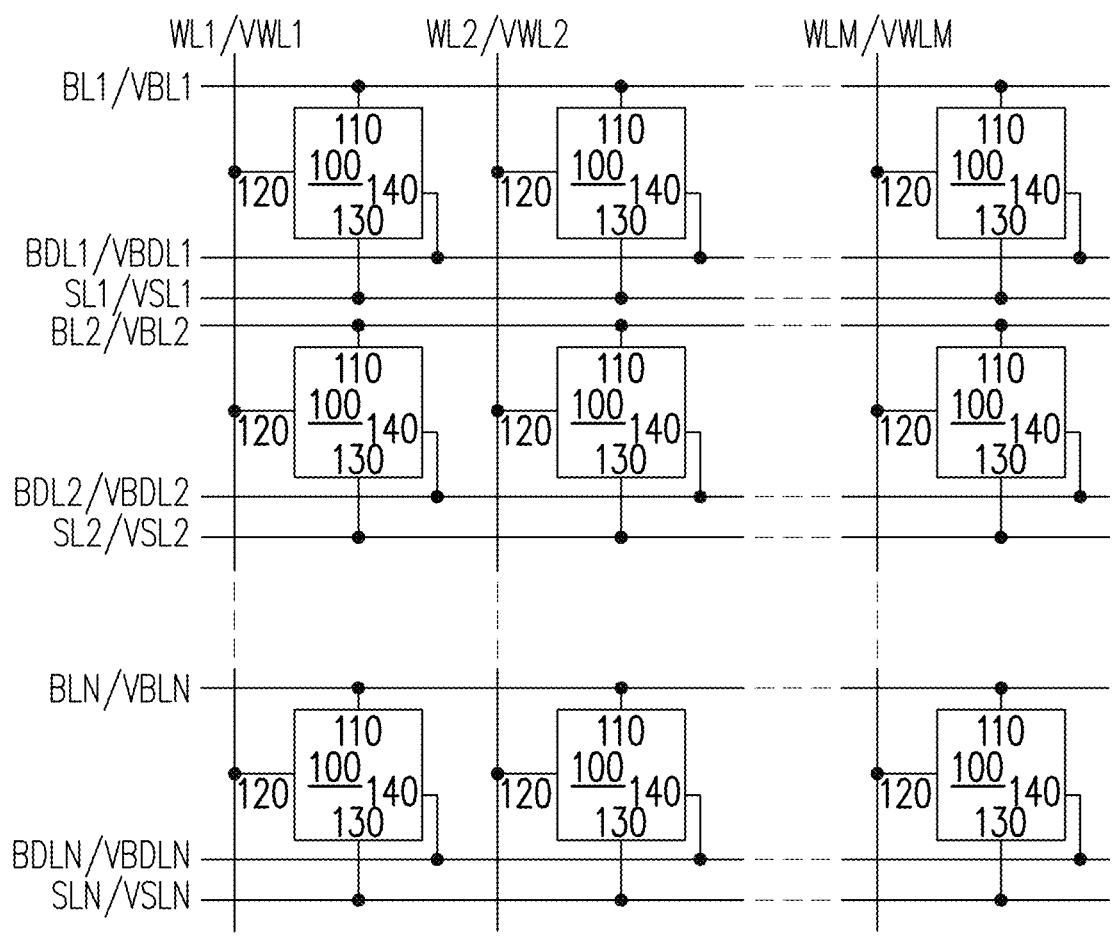
FIG. 3 is a schematic diagram of a memory array, in accordance with some embodiments.

FIG. 3 a schematic diagram of a memory array 300, in accordance with some embodiments. Memory array 300, also referred to as a memory macro in some embodiments, includes instances of memory cell 100, discussed above with respect to FIGS. 1-2C, arranged in a number M of columns and a number N of rows. The M columns correspond to word lines WL1-WLM, and the N rows correspond to bit lines BL1-BLN, source lines SL1-SLN, and body lines BDL1-BDLN.

Terminal 120 of each instance of memory cell 100 is electrically connected to one of word lines WL1-WLM, terminal 110 of each instance of memory cell 100 is electrically connected to one of bit lines BL1-BLN, terminal 130 of each instance of memory cell 100 is electrically connected to one of source lines SL1-SLN, and terminal 140 of each instance of memory cell 100 is electrically connected to one of body lines BDL1-BDLN.

Word lines WL1-WLM are configured to carry word line signals VWL1-VWLM corresponding to instances of voltage VWL discussed above; bit lines BL1-BLN are configured to carry bit line signals VBL1-VBLN corresponding to instances of voltage VBL discussed above; source lines SL1-SLN are configured to carry source line signals VSL1-VSLN corresponding to instances of voltage VSL discussed above; and body lines BDL1-BDLN are configured to carry body line signals VBDL1-VBDLN corresponding to instances of voltage VBDL discussed above.

In some embodiments, the instances of memory cell 100 do not include terminal 140, and memory array 300 does not include body lines BDL1-BDLN configured to carry body line signals VBDL1-VBDLN. In some embodiments, the instances of memory cells 100 include terminal 140 or another terminal (not shown) electrically connected to node N1, and memory array 300 includes body lines BDL1-BDLN or other signal lines (not shown) configured to carry one or more sets of signals in accordance with programming and read operations on the instances of memory cell 100.

FIG. 3 is simplified for the purpose of illustration. In various embodiments, memory array 300 includes one or more circuits (not shown), e.g., a control circuit, address decoder, or current detection circuit, configured to generate signals VWL1-VWLM, VBL1-VBLN, VSL1-VSLN, and VBDL1-VBDLN and detect instances of current Ic in accordance with the programming and read operations on memory cell 100 discussed above with respect to FIGS. 1-2C. In some embodiments, memory array 300 is configured to perform some or all of a method 400 of operating a memory cell, discussed below with respect to FIG. 4.

By the configuration discussed above, memory array 300 includes instances of memory cell 100 configured as discussed above and thereby capable of realizing the benefits discussed above with respect to memory cell 100.

Figure 4:
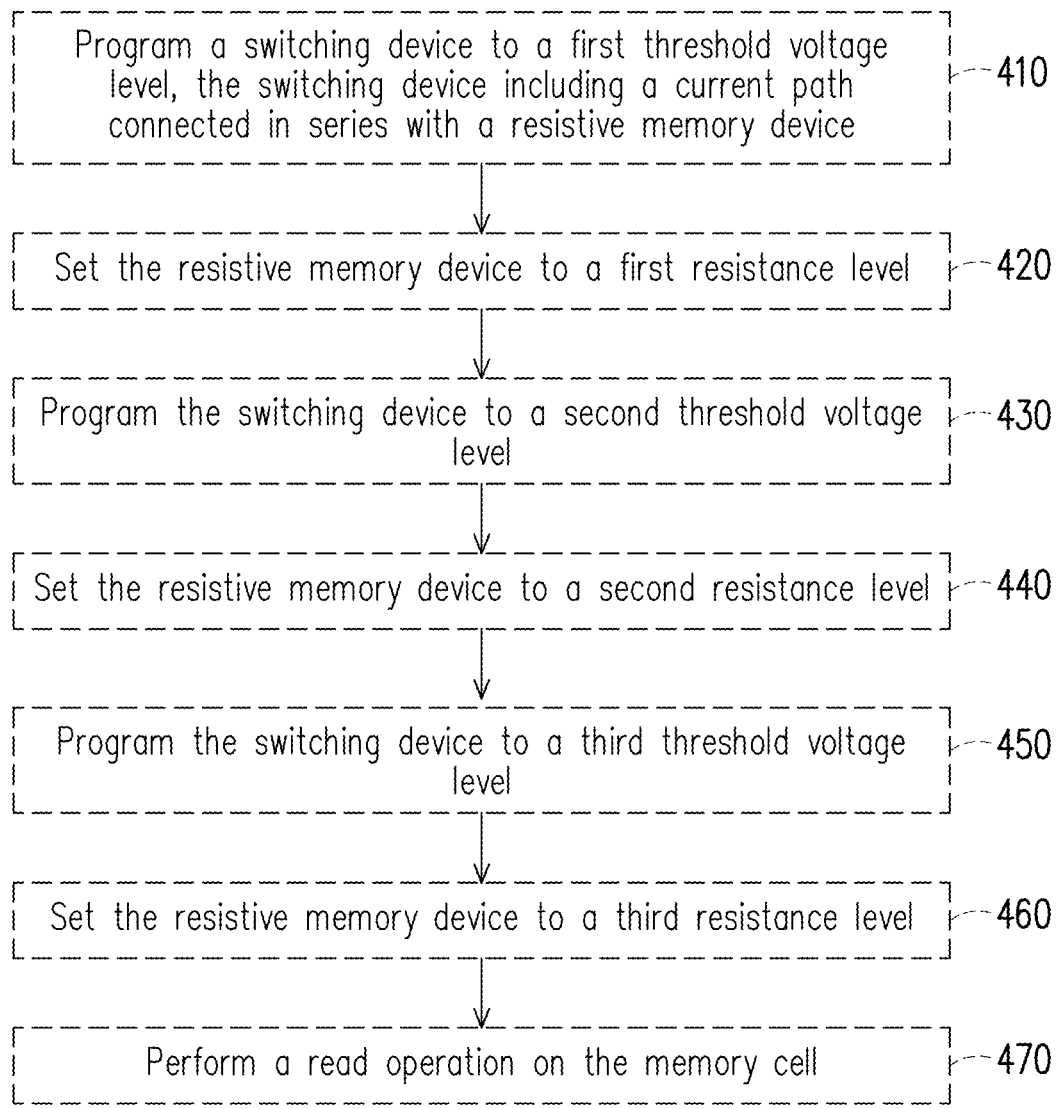
FIG. 4 is a flowchart of a method of operating a memory cell, in accordance with some embodiments.

FIG. 4 is a flowchart of method 400 of operating a memory cell, in accordance with some embodiments. Method 400 is usable with an NVM memory circuit, e.g., memory array 300 including instances of memory cell 100, discussed above with respect to FIGS. 1-3. In various embodiments, method 400 includes performing a programming operation including some or all of operations 410-460 and/or performing a read operation including operation 470, each discussed below.

The sequence in which the operations of method 400 are depicted in FIG. 4 is for illustration only; the operations of method 400 are capable of being executed in sequences that differ from that depicted in FIG. 4. In some embodiments, operations in addition to those depicted in FIG. 4 are performed before, between, during, and/or after the operations depicted in FIG. 4. In some embodiments, the operations of method 400 are a subset of operations of a method of operating a memory macro.

At operation 410, in some embodiments, a switching device is programmed to a first threshold voltage level, the switching device including a current path connected in series with a resistive memory device. The switching device is configured to have two or more threshold voltage levels, and programming the switching device to the first threshold voltage level includes programming the switching device to the lower of the two threshold voltage levels. For a given value of a gate voltage, the two threshold voltage levels correspond to two conductance levels of the current path, and the lower of the two threshold voltage levels corresponds to the higher of the two conductance levels.

In some embodiments, programming the switching device to the first threshold voltage level includes programming switching device T1 including current path T1CP to threshold voltage level Vth2 discussed above with respect to FIGS. 1-2C.

Programming the switching device to the first threshold voltage level includes applying a first voltage level to a gate of the switching device. In some embodiments, programming the switching device to the first threshold voltage level includes applying voltage VWL to terminal 120 of memory cell 100 discussed above with respect to FIGS. 1-3.

Programming the switching device to the first threshold voltage level includes applying one or more voltages to one or more terminals of the memory cell in addition to the gate of the switching device. In some embodiments, applying the one or more voltages to the one or more terminals of the memory cell includes one or more of applying voltage VBL to terminal 110, applying voltage VSL to terminal 130, or applying voltage VBDL to terminal 140 of memory cell 100 discussed above with respect to FIGS. 1-3.

In some embodiments, programming the switching device to the first threshold voltage level and performing some or all of one or more of operations 420-440 or 460 discussed below are part of a same programming operation. In some embodiments, programming the switching device to the first threshold voltage level is part of a first programming operation, and performing some or all of one of operations 420, 440, or 460 discussed below are part of a second programming operation separate from the first programming operation.

In some embodiments, programming the switching device to the first threshold voltage level includes determining and/or saving a programmed state, e.g., a logically high or low state, of the switching device prior to programming the switching device to the first threshold voltage level.

At operation 420, in some embodiments, the resistive memory device is set to a first resistance level. In some embodiments, setting the resistive memory device to the first resistance level includes setting resistive memory device R1 to the first resistance level, e.g., one of the HRS or the LRS, as discussed above with respect to FIGS. 1-2C.

Setting the resistive memory to the first resistance level includes applying a second voltage level greater than the first threshold voltage level to the gate of the switching device, applying a reference voltage level to an end of the current path of the switching device opposite an end coupled to the resistive memory device, and applying a third voltage level to a second terminal of the resistive memory device. In some embodiments, setting the resistive memory to the first resistance level includes applying voltage VWL to terminal 120 of switching device T1, applying voltage VSL to terminal 130 of switching device T1, and applying voltage VBL to terminal 110 of resistive memory device R1, as discussed above with respect to FIGS. 1-3.

In some embodiments, setting the resistive memory device to the first resistance level and programming the switching device to the first threshold voltage level in operation 410 are part of a same programming operation.

At operation 430, in some embodiments, the switching device is programmed to a second threshold voltage level. In some embodiments, programming the switching device to the second threshold voltage level includes programming switching device T1 to the second threshold voltage level, e.g., threshold voltage level Vth1, as discussed above with respect to FIGS. 1-2C.

Programming the switching device to the second threshold voltage level includes applying a fourth voltage level to the gate of the switching device. In some embodiments, programming the switching device to the second threshold voltage level includes applying voltage VWL to terminal 120 of memory cell 100 discussed above with respect to FIGS. 1-3.

Programming the switching device to the second threshold voltage level includes applying one or more voltages to one or more terminals of the memory cell in addition to the gate of the switching device. In some embodiments, applying the one or more voltages to the one or more terminals of the memory cell includes one or more of applying voltage VBL to terminal 110, applying voltage VSL to terminal 130, or applying voltage VBDL to terminal 140 of memory cell 100 discussed above with respect to FIGS. 1-3.

In some embodiments, programming the switching device to the first threshold voltage level in operation 410, setting the resistive memory device to one of the first, second, or third resistance levels in respective operation 420, 400, or 460, and programming the switching device to the second threshold voltage level are part of a same programming operation. In some embodiments, programming the switching device to the first threshold voltage level in operation 410 is part of a first programming operation, and programming the switching device to the second threshold voltage level is part of a second programming operation separate from the first programming operation.

In some embodiments, programming the switching device to the second threshold voltage level includes determining and/or saving a programmed state, e.g., a logically high or low state, of the switching device prior to programming the switching device to the second threshold voltage level.

At operation 440, in some embodiments, the resistive memory device is set to a second resistance level. Setting the resistive memory device, e.g., resistive memory device R1 discussed above with respect to FIGS. 1-2C, to the second resistance level is performed in the manner discussed above with respect to operation 420.

At operation 450, in some embodiments, the switching device is programmed to a third threshold voltage level. Programming the switching device, e.g. switching device T1 discussed above with respect to FIGS. 1-2C, to the third threshold level is performed in the manner discussed above with respect to operation 430.

At operation 460, in some embodiments, the resistive memory device is set to a second resistance level. Setting the resistive memory device, e.g., resistive memory device R1 discussed above with respect to FIGS. 1-2C, to the third resistance level is performed in the manner discussed above with respect to operation 420.

At operation 470, in some embodiments, a read operation is performed on the memory cell. Performing the read operation includes applying a fourth voltage level to the gate of the switching device, applying a fifth voltage level to the second terminal of the resistive memory device, and measuring a current through the resistive memory device and the current path of the switching device.

In some embodiments, performing the read operation includes applying voltage VBL on terminal 110, applying voltage VWL on terminal 120, applying voltage VBDL on terminal 140 if present, and measuring current on terminal 130 of memory device 100, as discussed above with respect to FIGS. 1-3.

In some embodiments, performing the read operation includes distinguishing between a first current level of the current corresponding to the resistive memory device, e.g., resistive memory device R1, having the first resistance level and the switching device, e.g., switching device T1, having the first threshold voltage level, a second current level of the current corresponding to the resistive memory device having a second resistance level and the switching device having the first threshold voltage level, a third current level of the current corresponding to the resistive memory device having the first resistance level and the switching device having a second threshold voltage level, and a fourth current level of the current corresponding to the resistive memory device having the second resistance level and the switching device having the second threshold voltage level.

By executing some or all of the operations of method 400, a memory cell including a resistive memory device coupled in series with a current path of a switching device is capable of being programmed to at least four states corresponding to first and second resistance levels of the resistive memory device combined with the first and second threshold voltages and corresponding conductance levels of the current path, thereby achieving the benefits discussed above with respect to memory cell 100 and memory array 300.

Figure 5:
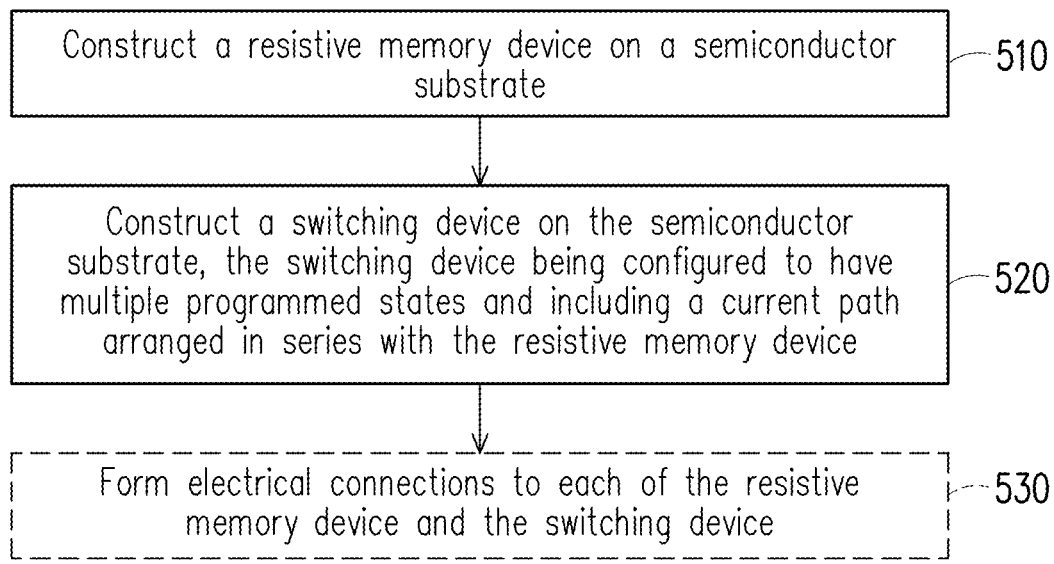
FIG. 5 is a flowchart of a method of manufacturing a memory cell, in accordance with some embodiments.

FIG. 5 is a flowchart of a method 500 of manufacturing a memory cell, in accordance with some embodiments. Method 500 is operable to form a memory cell 100 and/or memory array 300 discussed above with respect to FIGS. 1-3.

In some embodiments, the operations of method 500 are performed in the order depicted in FIG. 5. In some embodiments, the operations of method 500 are performed in an order other than the order of FIG. 5. In some embodiments, one or more additional operations are performed before, during, between, and/or after the operations of method 500.

In some embodiments, one or more operations of method 500 are a subset of operations of a method of forming an IC device including one or more NVM memory arrays, e.g., a system on a chip (SOC).

At operation 510, a resistive memory device is constructed on a semiconductor substrate. Constructing the resistive memory device includes constructing resistive memory device R1 in accordance with the embodiments discussed above with respect to FIGS. 1-3.

At operation 520, a switching device is constructed on the semiconductor substrate. The switching device is configured to have multiple programmed states and includes a current path arranged in series with the resistive memory device. Constructing the switching device includes constructing switching device T1 in accordance with the embodiments discussed above with respect to FIGS. 1-3.

In some embodiments, one or both of constructing the resistive memory device or constructing the switching device includes performing one or more FEOL operations. In some embodiments, one or both of constructing the resistive memory device or constructing the switching device includes performing one or more BEOL operations.

In some embodiments, performing one or more FEOL operations includes performing a first plurality of manufacturing operations, e.g., one or more of a lithography, diffusion, deposition, etching, planarizing, or other operation suitable for building a resistive, magnetic, or other material layer, a dielectric layer, and/or a gate structure adjacent to source and drain structures (S/D terminals) and overlying or otherwise being proximate to an active area of the semiconductor substrate.

In some embodiments, performing one or more BEOL operations includes performing a second plurality of manufacturing operations, e.g., one or more of a lithography, diffusion, deposition, etching, planarizing, or other operation suitable for building a resistive, magnetic, or other material layer, a dielectric layer, and/or a gate structure adjacent to source and drain structures (S/D terminals) and overlying or otherwise being proximate to an epitaxial layer, e.g., an SOI layer overlying the semiconductor substrate.

In some embodiments, constructing the switching device includes constructing electrical connections, e.g., via structures and/or contacts, to each of the gate structure and two S/D terminals. In various embodiments, constructing the switching device includes constructing a planar transistor, a fin field-effect transistor (FinFET), a gate-all-around (GAA) transistor, or other IC device suitable for selectively providing a current path between the S/D terminals responsive to a signal received at the gate structure.

In some embodiments, constructing the resistive memory device and the switching device includes constructing pluralities of resistive memory devices and switching devices of a memory array, e.g., memory array 300 discussed above with respect to FIG. 3.

At operation 530, in some embodiments, electrical connections to each of the resistive memory device and the switching device are formed. Forming the electrical connections includes performing one or more etching and deposition processes by which one or more metal lines are configured in accordance with one or more masks. Performing a deposition process includes depositing one or more conductive materials, e.g., one or more of Cu, Ag, W, Ti, Ni, Sn, Al or another metal or suitable material, e.g., polysilicon.

In some embodiments, forming the electrical connections includes forming word lines WL1-WLM, bit lines BL1-BLN, source lines SL1-SLN, and/or body lines BDL1-BDLN in accordance with the embodiments discussed above with respect to FIG. 3.

By performing some or all of the operations of method 500, an IC device is manufactured including a memory cell in which a resistive memory device coupled in series with a current path of a switching device is capable of being programmed to at least four states corresponding to first and second resistance levels of the resistive memory device combined with first and second programmed states of the switching device, thereby realizing the benefits discussed above with respect to memory cell 100 and memory array 300.

In some embodiments, an IC device includes a first terminal, a second terminal, a resistive memory device configured to have a first resistance level in a first state and a second resistance level in a second state, and a switching device including a control terminal and a current path, wherein the resistive memory device and the current path are coupled in series between the first and second terminals, and the switching device is configured to, responsive to a first voltage level at the control terminal, control the current path to have a first conductance level in a first programmed state and a second conductance level in a second programmed state. In some embodiments, the resistive memory device includes one of a ReRAM device, a PCM device, or a MRAM device. In some embodiments, the switching device includes one of a FeFET or a CTT device. In some embodiments, the switching device includes a transistor, the control terminal comprises a gate of the transistor, and the switching device is configured to, responsive to the first voltage level at the control terminal and a second voltage level at a body terminal of the transistor, control the current path to have a third conductance level in the first programmed state, and have a fourth conductance level in the second programmed state. In some embodiments, the IC device is configured to, responsive to the first voltage level at the control terminal, a second voltage level at the first terminal, and a reference voltage at the second terminal, conduct a first current when the resistive memory device is in the first state and the switching device is in the first programmed state, conduct a second current greater than the first current when the resistive memory device is in the first state and the switching device is in the second programmed state, conduct a third current greater than the second current when the resistive memory device is in the second state and the switching device is in the first programmed state, and conduct a fourth current greater than the third current when the resistive memory device is in the second state and the switching device is in the second programmed state. In some embodiments, the switching device includes a transistor, the first programmed state of the switching device corresponds to a linear region of the transistor, and the second programmed state of the switching device corresponds to a saturation region of the transistor. In some embodiments, the resistive memory device is configured to have a third resistance level in a third state. In some embodiments, the switching device is configured to, responsive to the first voltage level at the control terminal, control the current path to have a third conductance level in a third programmed state.

In some embodiments, a memory array includes a plurality of bit lines, a plurality of source lines, a plurality of word lines, and a plurality of NVM cells, each NVM cell of the plurality of NVM cells including a resistive memory device and a switching device coupled in series between a corresponding bit line of the plurality of bit lines and a corresponding source line of the plurality of source lines, wherein the resistive memory device is configured to have a first resistance level in a first state and a second resistance level in a second state, the switching device includes a control terminal coupled to a corresponding word line of the plurality of word lines, and the switching device is configured to, responsive to a first voltage level at the control terminal, control a current path in series with the resistive memory device to have a first conductance level in a first programmed state and a second conductance level in a second programmed state. In some embodiments, the resistive memory device comprises one of a ReRAM device, a PCM device, or a MRAM device, and the switching device comprises one of a FeFET or a CTT device. In some embodiments, the memory array includes a plurality of bias lines, wherein the switching device of each NVM cell of the plurality of NVM cells includes a body terminal coupled to a corresponding bias line of the plurality of bias lines, and is configured to, responsive to the first voltage level at the control terminal and a second voltage level at the body terminal, control the current path to have a third conductance level in the first programmed state, and have a fourth conductance level in the second programmed state. In some embodiments, the switching device of each NVM cell of the plurality of NVM cells includes a transistor, the first programmed state of the switching device corresponds to a linear region of the transistor, and the second programmed state of the switching device corresponds to a saturation region of the transistor. In some embodiments, one or both of the resistive memory device is configured to have a third resistance level in a third state, or the switching device is configured to, responsive to the first voltage level at the control terminal, control the current path to have a third conductance level in a third programmed state.

In some embodiments, a method of operating a NVM cell includes programming a switching device to a first threshold voltage level by applying a first voltage level to a gate of the switching device, and setting a resistive memory device to a first resistance level, a first terminal of the resistive memory device being coupled to a first end of a current path of the switching device, wherein setting the resistive memory to the first resistance level includes applying a second voltage level greater than the first threshold voltage level to the gate of the switching device, applying a reference voltage level to a second end of the current path of the switching device, and applying a third voltage level to a second terminal of the resistive memory device. In some embodiments, applying the second voltage level to the gate of the switching device includes applying a fourth voltage level other than the reference voltage level to a body terminal of the switching device. In some embodiments, the method includes programming the switching device to a second threshold voltage level by applying a fourth voltage level to the gate of the switching device. In some embodiments, each of the programming the switching device to the first threshold voltage level, setting the resistive memory device to the first resistance level, and the programming the switching device to the second threshold voltage level is part of a same programming operation. In some embodiments, the method includes programming the switching device to a third threshold voltage level by applying a fifth voltage level to the gate of the switching device. In some embodiments, the method includes setting the resistive memory device to a second resistance level by applying the second voltage level to the gate of the switching device, applying the reference voltage level to the second end of the current path of the switching device, and applying a fourth voltage level to the second terminal of the resistive memory device. In some embodiments, the method includes performing a read operation by applying a fourth voltage level to the gate of the switching device, applying a fifth voltage level to the second terminal of the resistive memory device, and measuring a current through the resistive memory device and the current path of the switching device, wherein a first current level of the current corresponds to the resistive memory device having the first resistance level and the switching device having the first threshold voltage level, a second current level of the current corresponds to the resistive memory device having a second resistance level and the switching device having the first threshold voltage level, a third current level of the current corresponds to the resistive memory device having the first resistance level and the switching device having a second threshold voltage level, and a fourth current level of the current corresponds to the resistive memory device having the second resistance level and the switching device having the second threshold voltage level.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit (IC) device comprising:
    a first terminal configured to receive a bit line signal configured by a control circuit;
    a second terminal configured to receive a source line signal configured by the control circuit;
    a resistive memory device configured to have a first resistance level in a first state and a second resistance level in a second state; and
    a switching device comprising a control terminal, a body terminal, and a current path,
    wherein
        the resistive memory device and the current path are coupled in series between the first and second terminals,
        the switching device is configured to, responsive to a first voltage level at the control terminal, control the current path to have a first conductance level in a first programmed state and a second conductance level in a second programmed state,
        the second conductance level is greater than the first conductance level, and
        the control circuit is configured to:
            set the resistive memory device to one of the first or second resistance levels after programming the switching device to the second conductance level and while increasing the second conductance level responsive to a second voltage level at the body terminal; and
            distinguish between each combination of the first and second resistance levels and the first and second conductance levels.

2. The IC device of claim 1, wherein the resistive memory device comprises one of a resistive random-access memory (ReRAM) device, a phase-change memory (PCM) device, or a magneto-resistive random-access memory (MRAM) device.

3. The IC device of claim 1, wherein the switching device comprises one of a ferroelectric field effect transistor (FeFET) or a charge-trap transistor (CTT) device.

4. The IC device of claim 1, wherein
    the switching device comprises a transistor,
    the control terminal comprises a gate of the transistor, and
    the switching device is configured to, responsive to the first voltage level at the control terminal, control the current path to:
    decrease the second conductance level responsive to a third voltage level at the body terminal.

5. The IC device of claim 1, wherein the IC device is configured to, responsive to the first voltage level at the control terminal, a third voltage level at the first terminal, and a reference voltage at the second terminal:
    conduct a first current when the resistive memory device is in the first state and the switching device is in the first programmed state,
    conduct a second current greater than the first current when the resistive memory device is in the first state and the switching device is in the second programmed state,
    conduct a third current greater than the second current when the resistive memory device is in the second state and the switching device is in the first programmed state, and
    conduct a fourth current greater than the third current when the resistive memory device is in the second state and the switching device is in the second programmed state.

6. The IC device of claim 5, wherein
    the switching device comprises a transistor,
    the first programmed state of the switching device corresponds to a linear region of the transistor, and
    the second programmed state of the switching device corresponds to a saturation region of the transistor.

7. The IC device of claim 1, wherein the resistive memory device is configured to have a third resistance level in a third state.

8. The IC device of claim 1, wherein the switching device is configured to, responsive to the first voltage level at the control terminal, control the current path to have a third conductance level in a third programmed state.

9. A memory array comprising:
    a plurality of bit lines configured to carry bit line signals configured by a control circuit of the memory array;
    a plurality of source lines configured to carry source line signals configured by the control circuit;
    a plurality of body lines configured to carry body line signals configured by the control circuit;
    a plurality of word lines configured to carry word line signals configured by the control circuit; and
    a plurality of non-volatile memory (NVM) cells, each NVM cell of the plurality of NVM cells comprising a resistive memory device and a switching device coupled in series between a corresponding bit line of the plurality of bit lines and a corresponding source line of the plurality of source lines,
    wherein
        the resistive memory device is configured to have a first resistance level in a first state and a second resistance level in a second state,
        the switching device comprises a control terminal coupled to a corresponding word line of the plurality of word lines and a bulk contact coupled to a corresponding body line of the plurality of body lines, the switching device is configured to, responsive to a corresponding word line signal at the control terminal, control a current path in series with the resistive memory device to have a first conductance level in a first programmed state and a second conductance level in a second programmed state, and the control circuit is configured to:
program the switching device to each of the first and second programmed states by applying the corresponding word line signal to the control terminal and applying a corresponding body line signal to the bulk contact;
set the resistive memory device to at least one of the first or second resistance levels while increasing the second conductance level responsive to the corresponding body line signal; and
distinguish between each combination of the first and second resistance levels and the first and second conductance levels.

10. The memory array of claim 9, wherein
the resistive memory device comprises one of a resistive random-access memory (ReRAM) device, a phase-change memory (PCM) device, or a magneto-resistive random-access memory (MRAM) device, and
the switching device comprises one of a ferroelectric field effect transistor (FeFET) or a charge-trap transistor (CTT) device.

11. The memory array of claim 9, wherein
the switching device of each NVM cell of the plurality of NVM cells comprises a transistor,
the first programmed state of the switching device corresponds to a linear region of the transistor, and
the second programmed state of the switching device corresponds to a saturation region of the transistor.

12. The memory array of claim 9, wherein one or both of
the resistive memory device is configured to have a third resistance level in a third state, or
the switching device is configured to, responsive to the first voltage level at the control terminal, control the current path to have a third conductance level in a third programmed state.

13. A method of operating a non-volatile memory (NVM) cell, the method comprising:
programming a switching device to a first threshold voltage level by applying a first voltage level to a gate of the switching device; and
setting a resistive memory device to a first resistance level, a first terminal of the resistive memory device being coupled to a first end of a current path of the switching device, wherein the setting the resistive memory device to the first resistance level comprises:
applying a second voltage level greater than the first threshold voltage level to the gate of the switching device while decreasing the first threshold voltage level by applying a third voltage level to a body terminal of the switching device, thereby operating the switching device in a saturation region;
using a control circuit of a memory array comprising the NVM cell to apply a reference voltage level to a second end of the current path of the switching device; and using the control circuit to apply a fourth voltage level to a second terminal of the resistive memory device; and
performing a read operation in which the control circuit distinguishes between each combination of the first resistance level and a second resistance level of the resistive memory device and the first threshold voltage level and a second threshold voltage level of the switching device.

14. The method of claim 13, wherein the applying the third voltage level to the body terminal of the switching device comprises applying the third voltage level other than the reference voltage level to the body terminal of the switching device.

15. The method of claim 13, further comprising:
programming the switching device to the second threshold voltage level by applying a fifth voltage level to the gate of the switching device.

16. The method of claim 15, wherein each of the programming the switching device to the first threshold voltage level, setting the resistive memory device to the first resistance level, and the programming the switching device to the second threshold voltage level is part of a same programming operation.

17. The method of claim 15, further comprising:
programming the switching device to a third threshold voltage level by applying a sixth voltage level to the gate of the switching device.

18. The method of claim 13, further comprising setting the resistive memory device to the second resistance level by:
applying the second voltage level to the gate of the switching device;
using the control circuit to apply the reference voltage level to the second end of the current path of the switching device; and
using the control circuit to apply a fifth voltage level to the second terminal of the resistive memory device.

19. The method of claim 13, wherein the performing the read operation comprises:
applying a fifth voltage level to the gate of the switching device;
using the control circuit to apply a sixth voltage level to the second terminal of the resistive memory device; and
measuring a current through the resistive memory device and the current path of the switching device, wherein
a first current level of the current corresponds to the resistive memory device having the first resistance level and the switching device having a second threshold level greater than the first threshold voltage level,
a second current level of the current corresponds to the resistive memory device having the second resistance level and the switching device having the second threshold voltage level,
a third current level of the current corresponds to the resistive memory device having the first resistance level and the switching device having the first threshold voltage level, and
a fourth current level of the current corresponds to the resistive memory device having the second resistance level and the switching device having the first threshold voltage level.

20. The method of claim 13, further comprising:
prior to the programming the switching device to the first threshold voltage level, determining and/or saving a programmed state of the switching device.

* * * * *